United States Patent
Kwatra et al.

(10) Patent No.: US 10,891,843 B2
(45) Date of Patent: Jan. 12, 2021

(54) METHODS AND SYSTEMS FOR MANAGING HAZARD RISK BASED ON LOCATION AND INCIDENT DATA

(71) Applicant: INTERNATIONAL BUSINESS MACHINES CORPORATION, Armonk, NY (US)

(72) Inventors: Shikhar Kwatra, Durham, NC (US); Jeremy Fox, Georgetown, TX (US); Corville Allen, Morrisville, NC (US); John Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/239,317

(22) Filed: Jan. 3, 2019

(65) Prior Publication Data
US 2020/0219372 A1    Jul. 9, 2020

(51) Int. Cl.
| | |
|---|---|
| *G08B 21/02* | (2006.01) |
| *G06N 3/08* | (2006.01) |
| *G06F 16/906* | (2019.01) |
| *G08B 21/22* | (2006.01) |
| *G06N 20/00* | (2019.01) |
| *G06F 9/455* | (2018.01) |

(52) U.S. Cl.
CPC .......... *G08B 21/02* (2013.01); *G06F 16/906* (2019.01); *G06N 3/08* (2013.01); *G06N 20/00* (2019.01); *G08B 21/22* (2013.01); *G06F 9/455* (2013.01)

(58) Field of Classification Search
CPC ....... G08B 21/02; G08B 21/22; G06F 16/906; G06F 9/455; G06N 20/00; G06N 3/08
See application file for complete search history.

(56) References Cited

U.S. PATENT DOCUMENTS

| | | |
|---|---|---|
| 2008/0186189 A1 | 8/2008 | Azzaro et al. |
| 2016/0155312 A1 | 1/2016 | Osorio |
| 2017/0000387 A1* | 1/2017 | Forth .................... A61B 5/1117 |
| 2017/0249821 A1 | 8/2017 | Coleman Boone et al. |
| 2020/0046262 A1* | 2/2020 | Annegarn ............ A61B 5/1123 |

FOREIGN PATENT DOCUMENTS

WO    2017049188 A1    9/2016

* cited by examiner

*Primary Examiner* — Quan-Zhen Wang
*Assistant Examiner* — Rajsheed O Black-Childress
(74) *Attorney, Agent, or Firm* — Griffiths & Seaton PLLC

(57) ABSTRACT

Embodiments for managing hazard risk by one or more processors are described. A presence of an individual at a location is detected. A hazard risk score is calculated based on at least one data source associated with at least one of the individual and the location. A notification of the calculated hazard risk score is caused to be generated.

21 Claims, 10 Drawing Sheets

METHODS AND SYSTEMS FOR MANAGING HAZARD RISK BASED ON LOCATION AND INCIDENT DATA

BACKGROUND OF THE INVENTION

Field of the Invention

The present invention relates in general to computing systems, and more particularly, to various embodiments for managing hazard risk based on data associated with, for example, the location and/or previous incidents.

Description of the Related Art

Each year, millions of people receive various types of injuries in normal, common locations, such as parks, malls, transport hubs (e.g., airports), etc. Perhaps most alarming are the incidents that result in traumatic brain injuries (TBIs), which contribute to the deaths of thousands of people and millions of visits to hospitals and emergency departments.

One issue that at least potentially contributes to the problem is that incidents that occur in these locations, such as falls and people walking (or running) into objects, are generally not tracked and correlated to the locations in which they occur (i.e., at least not in a manner which is easily accessible by most people). As such, people who may be prone to such injuries, such as the elderly or sick, have little or no warning about the potential risks or hazards.

SUMMARY OF THE INVENTION

Various embodiments for managing hazard risk by one or more processors are described. In one embodiment, by way of example only, a method for managing hazard risk, again by one or more processors, is provided. A presence of an individual at a location is detected. A hazard risk score is calculated based on at least one data source associated with at least one of the individual and the location. A notification of the calculated hazard risk score is caused to be generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
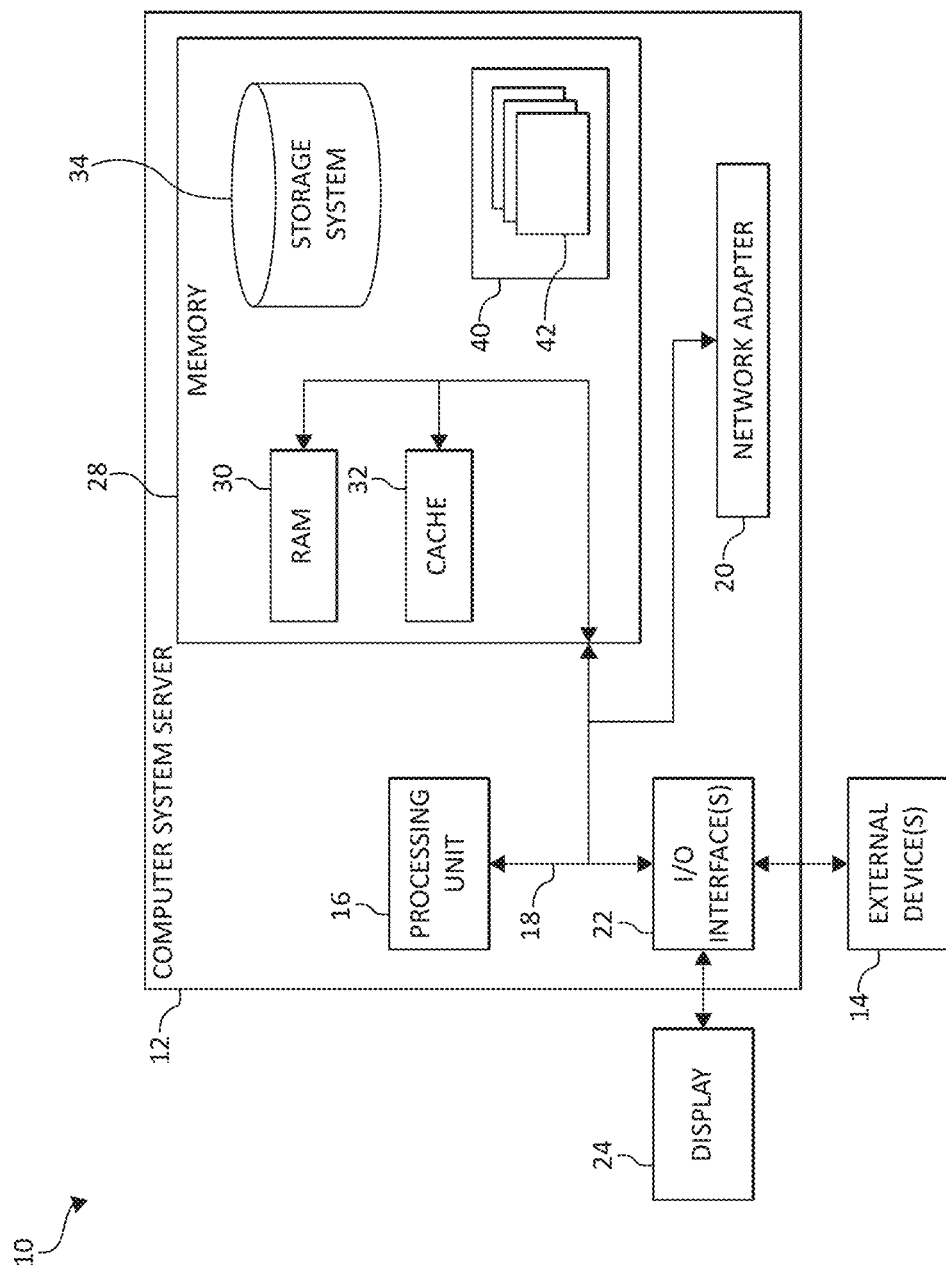
FIG. 1 is a block diagram depicting an exemplary computing node according to an embodiment of the present invention.

As discussed above, each year, millions of people receive various types of injuries in normal, everyday public locations, such as parks, malls, transport hubs (e.g., airports), etc. Perhaps most alarming are the incidents that result in traumatic brain injuries (TBIs), such as concussions, which contribute to the deaths of thousands of people and millions of visits to hospitals and emergency departments. Concussions are the result of a sharp blow or jolt to the head. When an acceleration or deceleration imparted to the head is sufficiently violent, the brain may impact the skull, causing, for example, temporary loss of function, broken blood vessels, or, in severe cases, brain hemorrhaging.

The most common cause of TBIs is fall injuries, which may be responsible for as much as 40% of all brain injuries. Children and the elderly are most likely to experience TBIs due to a fall. In fact, by some estimates, 81% of all brain injuries suffered by those over the age of 65 are the result of falls. Being struck by a blunt object is the second leading cause among all ages, and car accidents are the third.

The state of the art for concussion detection in people taking part in high risk endeavors, such as athletes, involves instrumented helmets and embedded sensors in, for example, mouth guards and contact sheets that may determine, in real-time, the force of impact at the sensor locale. The data may be accumulated and analyzed to determine the impact forces and trauma absorbed over time. However, such instruments and systems do nothing to address the countless incidents in which people receive TBIs, or other injuries, through falls and other accidents during common, daily activities.

Additionally, many head injuries that do not exhibit external damage may go unreported by children, teenagers, and the elderly. Further, head injuries that are not initially considered sever may become significant if there is a pattern of head trauma over a relatively short period of time (e.g., a few days). Besides head injuries, there are other types of injuries may occur to other parts of the body, such as ankles, knees, hips, wrists, etc., perhaps also due to a fall or the individual colliding with an object while standing (e.g., walking/running into an object).

One issue that at least potentially contributes to the problem is that incidents that occur in such locations, such as falls and people walking (or running) into objects, are generally not tracked and correlated to the locations in which they occur (i.e., at least not in a manner which is easily accessible by most people). As such, people who may be prone to such injuries, such as the children, the elderly, or the sick, have little or no warning about the potential risks.

Thus, there is a need for methods and systems for managing the risk of hazards, such as from falls or walking into objects, and/or alerting users of such risks to reduce the probability of these types of injuries.

To address these needs, some embodiments described herein provide methods and systems that may, for example, determine and report the possibility (or risk) of hazards with respect to users utilizing (e.g., carrying on their person/body) commonly used computing devices (e.g., mobile electronic devices, such as mobile phones and wearable technology devices). The system may utilize abnormal events in patterns of movement that are correlated with the environmental characteristics and/or locations where the events occurred and assign (or determine or calculate) a risk score (or grade or threat level) for hazards. Such may be used to assist users, or other individuals, in taking proactive actions to avoid the hazards.

In some embodiments, the methods and systems described herein utilize a multi-layer neural network mechanism that utilizes weighted parameters involving, for example, gait analysis, geo-location, and region-based convolutional neural network (R-CNN) detected activity to a relatively refined and granular level. As such, the methods and systems may be capable of determining abnormal changes in patterns of users' walking/movement vectors (e.g., changes in gait, changes in accelerometer readings, etc.) with respect to trained walking/movement vector to determine a hazard risk score, predict falls (or other incidents) based on risk source and crowd-sourced data specific to the geo-spatial conditions and environmental factors, and/or provide proactive mitigating actions.

In some embodiments, the methods and systems described herein may amplify the risk information associated with (or available for) an individual, organization, or business for collecting data from multiple users (e.g., "crowdsourcing") about specific locations (or environments, architectures, venues, facilities, etc.) and utilize that data to provide a hazard risk score (or hazard score or risk score) for an individual user and/or the locations.

In some embodiments, the systems (and/or methods) utilize one or more data sources associated with individuals (or users) and various locations. For example, with respect to the user(s), the system may monitor and/or collect data from a mobile electronic device carried by the user, such as a mobile phone or wearable device (e.g., a smart watch). The data may include the location of the user and various types of data related to the activity of the user, such as the user's gait (i.e., manner, stride, pace, etc. of walking/running), speed (i.e., walking or running speed), acceleration, etc., as well as biometric data, such as heart rate, blood pressure, etc.

With respect to locations, the system may monitor and/or collect data related to the layout of the location, steps at the location (e.g., presence of steps, number of steps, number of consecutive/successive steps, step height, etc.), floor surface types (e.g., smooth concrete, tile, etc.), objects at the location (e.g., the presence, height, etc. of furniture, walls, etc.), hand rails at the location (e.g., number, position, height, etc.). Such data may be, for example, collected or detected by sensors (e.g., cameras at the locations, using R-CNN analyses) or retrieved from data sources related to the locations, such as schematics, plans, layouts, etc., which may be available through online channels. Additionally, the system may monitor various data sources related to falls or other hazardous incidents (or abnormalities, events, etc.) at the locations, such as online data sources (e.g., newsfeeds, social media activity/posts, emails, text messages, etc.).

Further, the system may monitor and/or collect data related to other individuals (or users) when at the various locations. That is, the system may utilize data related to the activity of the other individuals when (previously) at the location, such as gait (i.e., manner, stride, pace, etc. of walking/running), speed (i.e., walking or running speed), acceleration, etc., as well as biometric data, such as heart rate, blood pressure, etc.), which may be collected by, for example, computing devices (e.g., mobile phones, wearable devices, etc.) carried by the other individuals. Also, the system may monitor the individuals' devices for data that may indicate incidents, such as incident or hazard vectors, which may be caused by and/or indicative of a sudden decrease in movement, a sudden acceleration (or accelerometer) change, a sudden gait change, etc.

Other data sources that may be used may be associated with the users (i.e., a particular user or other individuals from which data has been gathered). Other data sources may include, for example, profiles (e.g., cognitive profiles) of the users and/or a detected situational condition (or surrounding context) associated with the individuals (e.g., determined utilizing cameras, speakers, microphones, the detected presence/operation of computing devices, etc.). Profiles (e.g., cognitive profiles) for users may be generated based on any appropriate data sources associated with the users that are accessible by the system (perhaps with the permission or authorization of the user). Examples of such data sources include, but are not limited to, computing systems/devices/nodes (e.g., IoT devices) associated with the user, communication sessions and/or the content (or communications) thereof. For example, phone calls, video calls, text messaging, emails, in person/face-to-face conversations, spoken statements, etc. of the user(s) may be analyzed using natural language processing (NLP), a Mel-frequency cepstral (MFC) algorithm and/or using Mel-frequency cepstral coefficients (MFCCs), etc. Such analyses may include classifying natural language, analyzing tone, and analyzing sentiment (e.g., scanning for keywords, key phrases, etc.). Other data sources may include a profile of (or basic information about) the user (e.g., job title, place of work, length of time at current position, family role, age, health condition/issues, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, a cognitive analysis is performed, utilizing all the available data, to determine (or calculate) a hazard risk score (or grade or threat level) for a user and/or a location (or venue). The hazard risk score may be based on any suitable scale, such as positive or negative integers, percentages, decimals, etc. (e.g., a "score") or may include a grade of threat level, such as "high" or "low" (e.g., a grade/threat level).

In particular, in some embodiments, a hazard risk score (or grade) is determined for a user when the user is detected as being at a particular location (or perhaps if a user's schedule indicates that he/she will be at a particular location in the future). A signal representative of the determined hazard risk score may be generated. For example, a notification of the hazard risk score may be provided to the user (or other individuals, such as the user's friends, family, contacts, doctors, caretakers, etc.), or more particularly, rendered by a computing node associated therewith, so that proactive measures may be taken to prevent any incidents.

In some embodiments, such a notification is (only) sent if the hazard risk score exceeds a predetermined threshold. Over time, the methods and systems described herein may determine correlations (or insights) between the available data and incidents (e.g., that occur at the various locations), perhaps with feedback provided by the users (e.g., in response to generated notifications), that allows for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of hazard risk as described herein. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such a voice response system, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing hazard risk by one or more processors is provided. A presence of an individual at a location is detected. A hazard risk score is calculated based on at least one data source associated with at least one of the individual and the location. A signal representative of the calculated hazard risk score may be generated. For example, in some embodiments, a notification of the calculated hazard risk score is generated (or caused to be generated).

The calculating of the hazard risk score may be performed utilizing a cognitive analysis. The at least one data source may include data associated with the presence of other individuals at the location. The at least one data source may include data collected by a mobile electronic device associated with the individual. The at least one data source may include an online data source associated with the location.

The at least one data source may include environmental factors associated with the location. The environmental factors may be associated with at least one of floor surface type at the location, steps at the location, and the presence of objects at the location.

The causing of the notification of the calculated hazard risk score to be generated may include causing the notification to be rendered by a computing node associated with at least one of the individual and a caretaker of the individual.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc., and/or any combination thereof. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
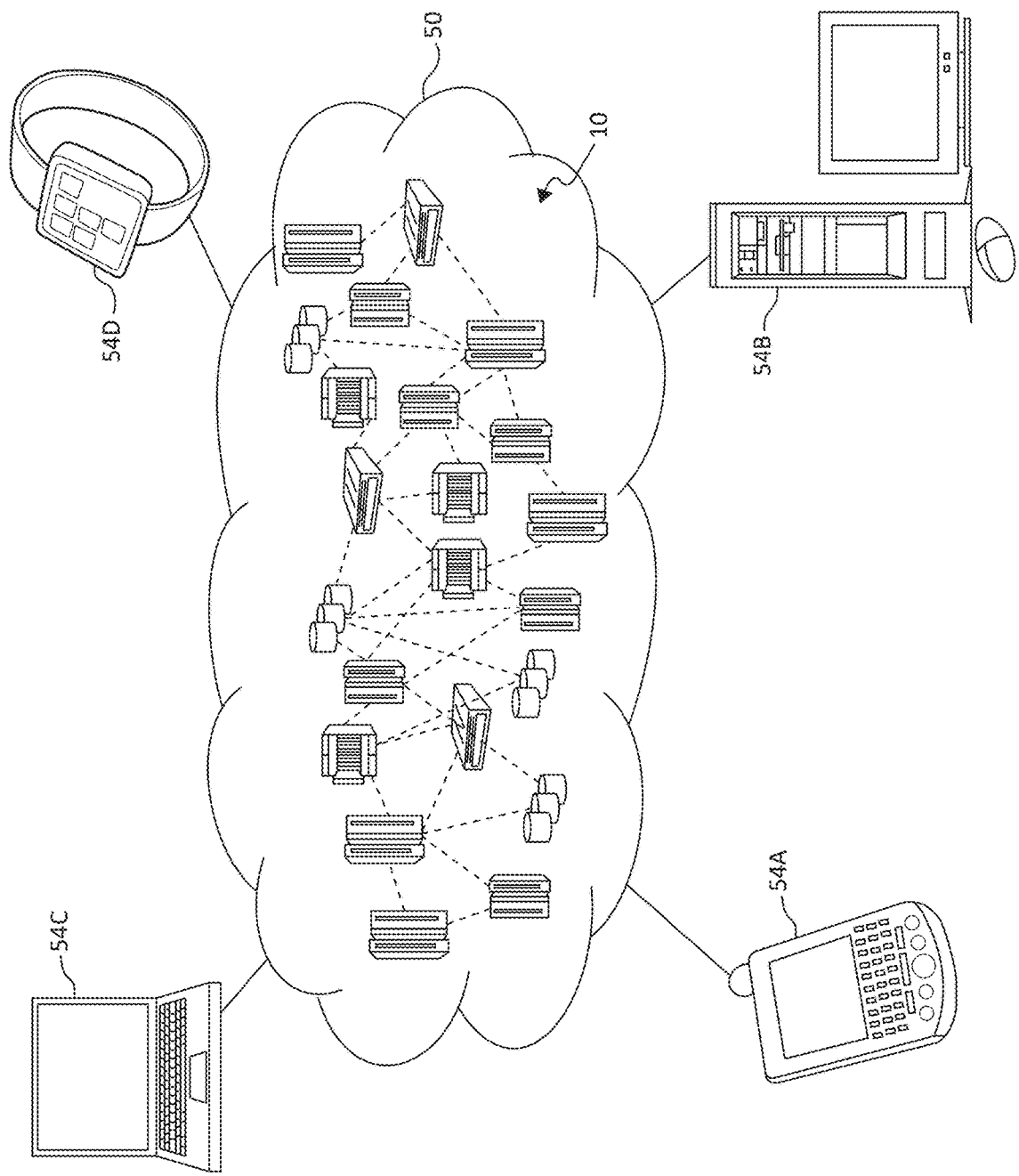
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and wearable device (e.g., a smart watch) 54D may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-D shown in FIG. 2 are intended to be illustrative only and that computing nodes 10 and cloud computing environment 50 can communicate with any type of computerized device over any type of network and/or network addressable connection (e.g., using a web browser).

Figure 3:
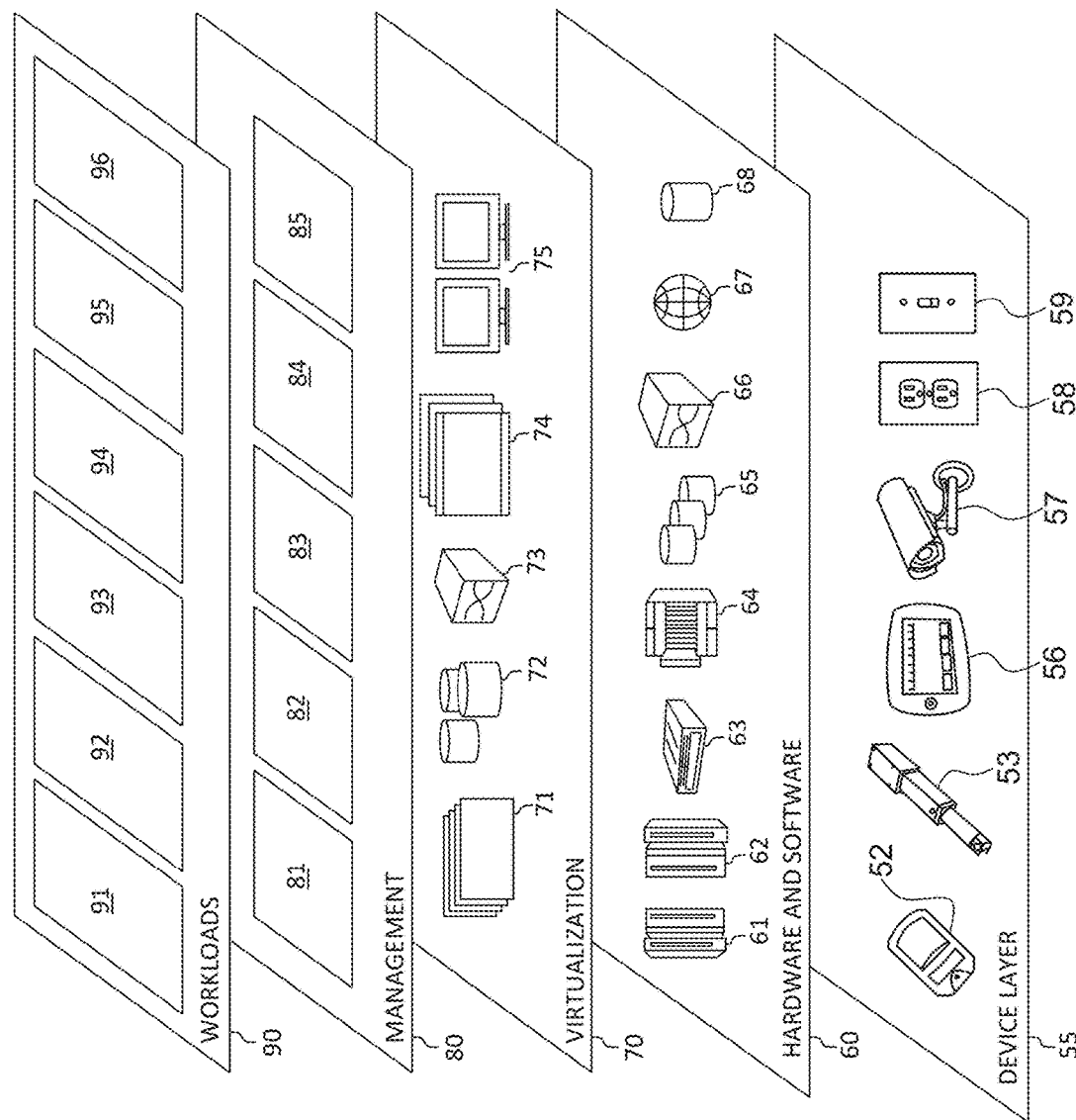
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing hazard risk as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments described herein, methods and systems are provided that, for example, determine and report the possibility (or risk) of hazards with respect to users utilizing (e.g., carrying on their person/body) commonly used computing devices (e.g., mobile electronic devices, such as mobile phones and wearable technology devices). The system may utilize abnormal events in patterns of movement that are correlated with the environmental characteristics and location where the events occurred and assign (or determine) a risk score (or grade or threat level) for hazards. Such may be used to assist users, or other individuals, in taking proactive actions to avoid the hazardous conditions.

Figure 4:
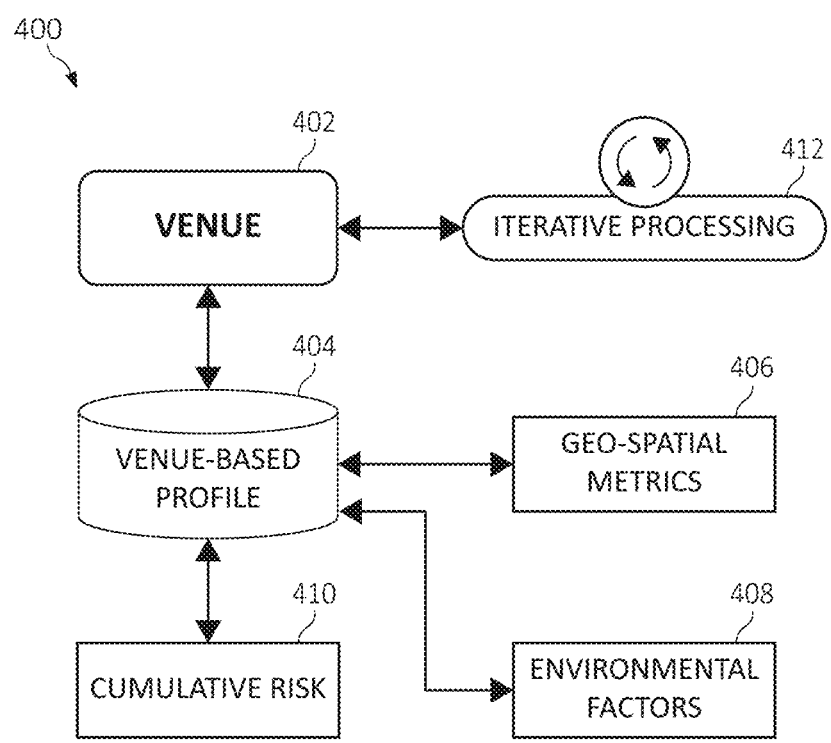
FIG. 4 is a block diagram of an exemplary system for determining hazard risk associated with a location according to an embodiment of the present invention.

FIG. 4 illustrates a system (and/or method) 400 for determining (or calculating) a venue (or location) hazard risk score 402 (or a portion of a hazard risk score for an individual based on the venue) and/or determining a venue (or venue-based) profile 404 according to some embodiments described herein.

The venue profile 404 may be based (and/or determined based on) geo-spatial metrics 406, environmental factors 408, and cumulative risk 410. The geo-spatial metrics 406 may refer to the physical location of the venue (e.g., longitude and latitude as determined via GPS), along with size (e.g., area), altitude, weather information, etc, and the type of venue (e.g., public park, hotel, shopping mall, transport hub, etc.). The environmental factors 408 may refer to any characteristics of the venue that may related to the hazards, risk of hazards, or (potentially) hazardous conditions described herein. Examples include, for example, floor surface type, information related to steps (e.g., the presence of steps, the total number of steps, number of successive steps, etc.), information related to hand rails (e.g., whether or not steps have hand rails, the height of the hand rails, etc.), and information related to objects location at the venue (e.g., the presence of furniture and/or walls, the size/height of the objects, the number of objects, etc.). The cumulative risk 410 may refer to, for example, information related to incidents at the venue (e.g., reported falls, hazardous events, etc.) and/or risk-based factor tensioning. The various data utilized and/or included in the geo-spatial metrics 406, environmental factors 408, and the cumulative risk 410 may be retrieved from any suitable data source, such as GPS data, various types of sensors (e.g., cameras at the venue), and/or online data sources (e.g., newsfeeds, social media activity, etc.).

The venue hazard risk score 402 may be determined (and/or updated) based on the profile 404 along with iterative processing 412 (e.g., a cognitive analysis, as described herein). In some embodiments, combining the impact risk and the incident type or abnormality rate based on the number of individuals in the system, a model may be defined to generate a hazard score for an environment (or venue or location), down to a relatively small area at the location (e.g., a particular room or area). The venue hazard risk score 402 and/or the profile 404 may be provided to a user (e.g., via an electronic message) when the user is detected as being present at the venue in question and/or may otherwise be used by the methods and systems described herein.

In some embodiments, risk classification (or the calculating of hazard risk scores) is performed utilizing crowdsourced incidents (i.e., information gathered via multiple users) with respect to various locations or venues. If the system receives information that indicates a relatively high number and intensity of incidents (or abnormalities, falls, etc.) at a particular location, the system may proactively notify various individuals (or users), such as administrators or owners of the venue and/or individuals (e.g., patrons) at the venue (or whose schedule indicates that he/she will be at the venue in the future).

In some embodiments, detected incidents (and/or calculated hazard risks scores or grades) may be classified into three categories: high, medium, and low. High and medium risk incidents may occur based on the level of abnormalities, the risk assessment, and the incident vector for the body area affected or potentially affected based on the data collected by the devices of multiple users. Low risk incidents may occur (or be determined) based primarily on the gait of users, environment obstacles, and the incident vector for low impact based impacts gathered from devices. The system may compile data based on the events and geographical, environment, and location data to quantify the risk at the location for the users.

Figure 5:
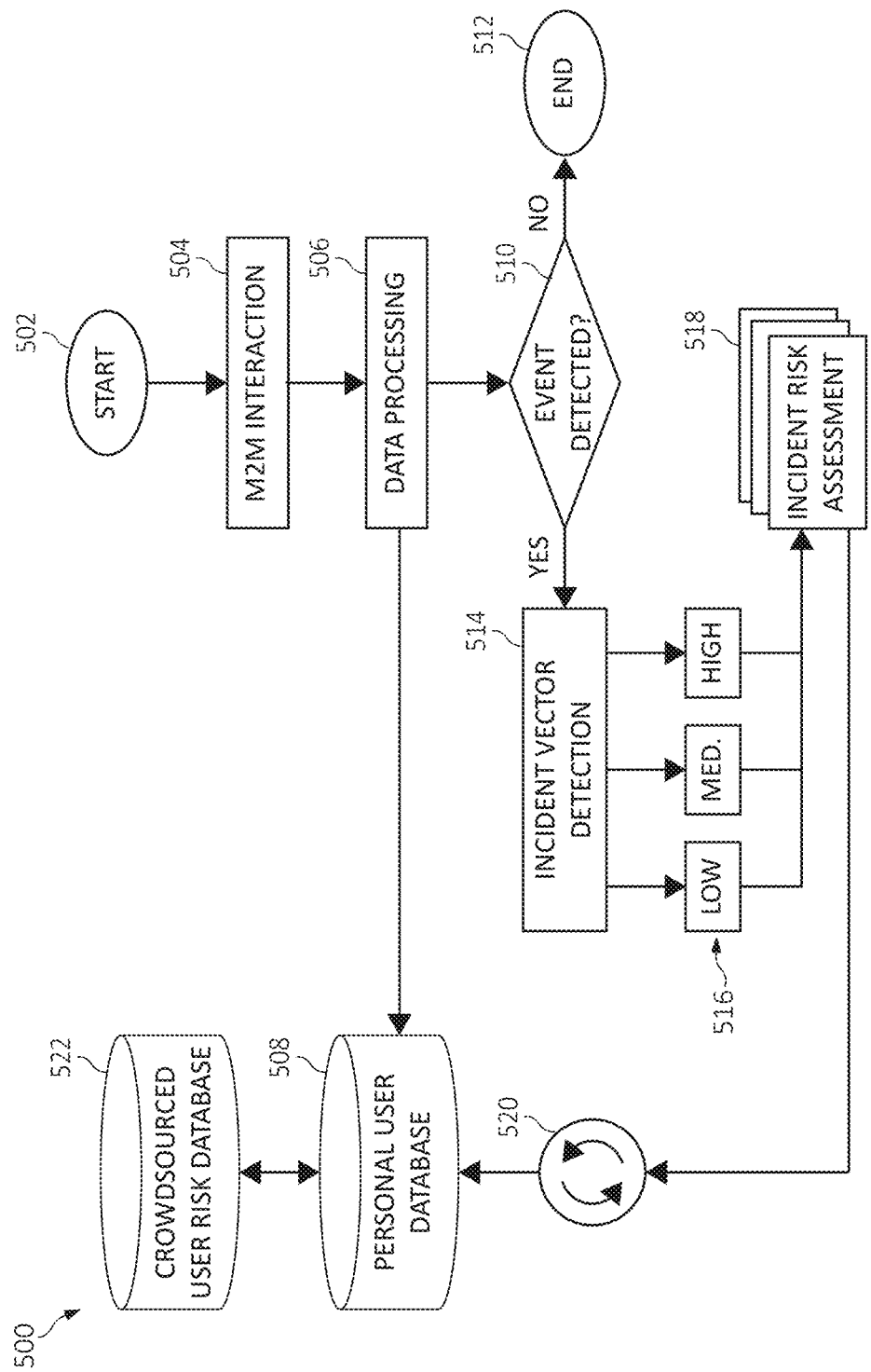
FIG. 5 is a block diagram/flow chart of a method and/or system for managing hazard risk according to an embodiment of the present invention.

FIG. 5 illustrates a method (and/or system) 500 for managing hazard risk according to some embodiments described herein. In particular, the method 500 shown in FIG. 5 may be utilized to gather information from users which may be utilized to determine a hazard risk score for other users and/or particular locations. At block 502, the method begins with, for example, a user utilizing (and/or carrying on their person) one or more computing devices, such as a mobile phone and/or a wearable device (e.g., a smart watch).

In the depicted embodiment, at block 504, various machine-to-machine (M2M) interaction occurs. In particular, computing devices carried by the user may communicate with other devices in the vicinity (e.g., at the location or other devices carried by the user), such as cameras, microphones, etc., to detect or monitor the actions or activity of the user (e.g., via wireless communication, near-field communication, ad hoc networks, etc.). Even when the devices are not linked, device data may be correlated based on the time at which events are detected after being uploaded (or transferred) to a common database (e.g., on the cloud) for analysis).

At block 506, data processing is performed. The data processing 506 may include an initial training or training assessment. For example, the user's normal walking vectors may be detected with the user's computing devices (e.g., gyroscopes, accelerometers, GPS, etc.), and training may be performed using multivariate geo-spatial and temporal metric dimensions. The multivariate geo-spatial and temporal metric dimensions may take into account gait, normal velocity, and accelerated velocity for walking and running and be co-referenced with hazardous events (or incidents) for intensity. The training data may be stored in a personal user database 508.

At block 510, if no events (e.g., abnormalities, falls, etc.) are detected, at block 512 the method 500 ends (and/or returns to block 506 for additional training). If an event is detected, at block 514, incident vector detection is performed at block 514. In some embodiments, a deep learning neural network (DLNN) machine learning algorithm is utilized, which may take into account input features pertaining to geo-spatial conditions and perform object detection gathered from an incident vector matrix. The incident vector matrix data may include directional sensing (e.g., magnetic sensor reading) data gathered from the user's computing devices (e.g., a mobile phone in conjunction with linked wearable devices or post linked wearable data. The turbulence or acceleration/deceleration level of events may be learned over a period of time period (T). The matrix may also include accelerometer readings and abnormality activity detection, which may include a sudden decrease in movement, a sudden change in gait, a sudden change in accelerometer reading, or a combination thereof.

At steps 516 and 518, an incident (or hazardous event) risk assessment may be performed. Risk vectors may be computed based on input incident vectors, as described above. Over a configurable time period (T), risk abnormality is detected if the system detects an anomaly above a predetermined (and/or configurable) threshold in the incident vector readings obtained from monitoring various devices or aggregated device data. A correlation engine, which may include a DLNN machine learning mechanism, may be used for object detection and activity recognition of the user in order to determine or predict the level of impact by understanding the level of threshold from previous statistical health-risk data. The gait type, velocity, accelerometer data, device orientation, and rate of change during the particular time period may be utilized as key features to detect and predict incident (or hazard) risk. In some embodiments, k-means clustering, as is commonly understood, may be used to cluster similar impacts and activities in order to fortify the correlation of the incident vectors and the impact on the user once the anomalous event has been assessed. A similar k-means clustering method may be used to detect anomalies in normal movement and actions with the users to detect, for example, a dramatic shift in the combination of key features.

As described in greater detail below, the accumulated incident impact may be determined by taking the integral of the output classifier function, which may either act as a sudden step function, ramp function, or take sigmoid form. A binary classifier, in its simplest form, may be used in some embodiments to classify the abnormality as low, medium, or high risk. The determined incident impact may undergo iterative processing at block 520 (e.g., via a cognitive analysis) and be sent to and/or stored in the user database 508. The user database 508 may be shared or sent to a crowdsourced user risk database 522, which may then be utilized to determine a hazard risk score for other users and/or a location, as described above.

Figure 6:
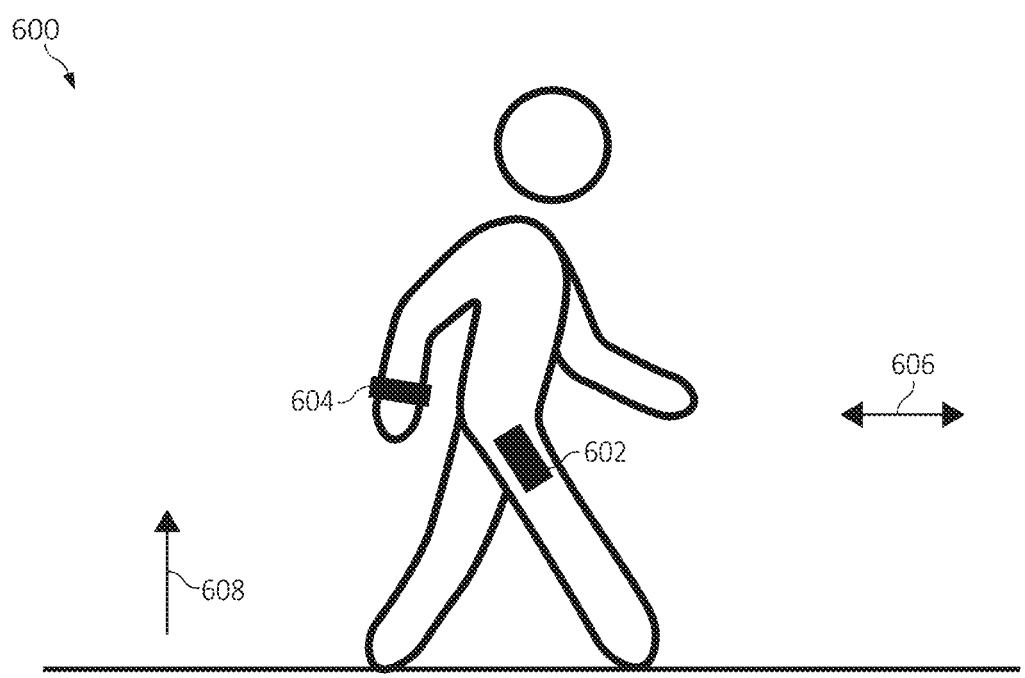
FIGS. 6 and 7 are side views of a user carrying at least one computing device according to an embodiment of the present invention.

FIG. 6 illustrates a user 600 with multiple computing devices on their person (e.g., the user is carrying and/or wearing the devices). In the embodiment shown, the user 600 has a first computing device 602 coupled to a side of their hip, and a second computing device 604 on one of their wrists. The first computing device 602 may include a mobile phone or PDA (e.g., carried in a pocket or on a belt), and the second computing device 604 may include a wearable device, such as smart watch (e.g., worn on the wrist). As described above, the first and second computing devices 602 and 604 may be used to collect various types of data associated with the user 600, such as lateral velocities and/or accelerations, as indicated by arrow 606, as well vertical movement, as indicated by arrow 608, which may be used to perform, for example, a gait analysis of the user and/or detect events or incidents (e.g., falls, etc.).

Figure 7:
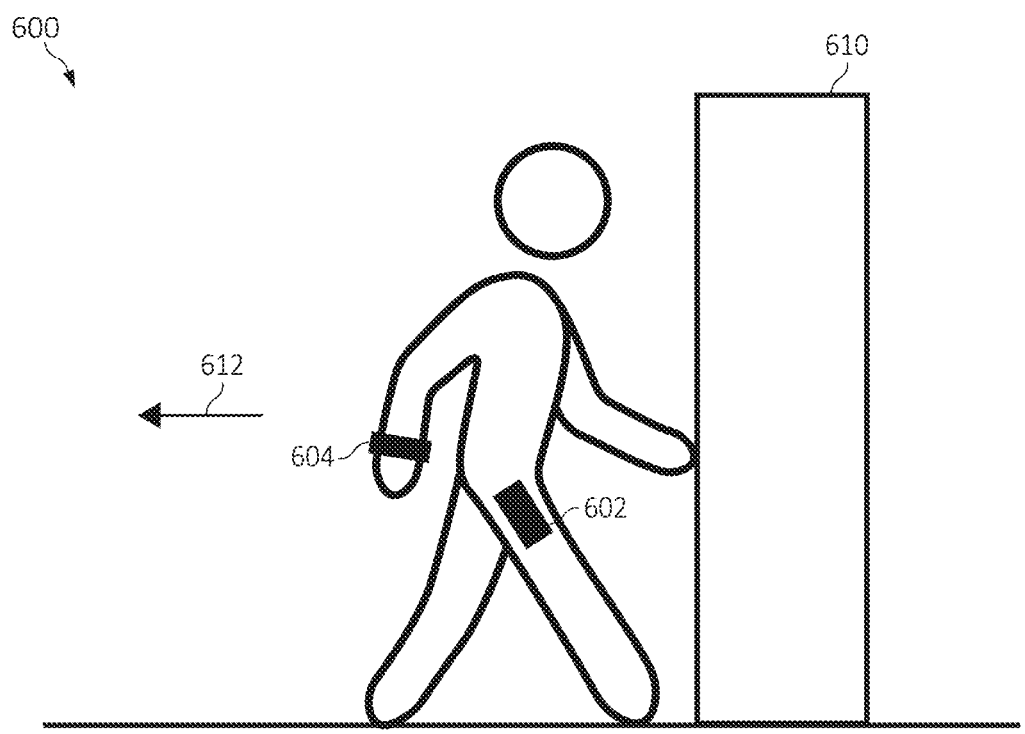

FIG. 7 illustrates the user 600 experiencing an example of an abnormality (or event or incident). In particular, the user 600 is walking (or running) into an object 610 (e.g., a wall or piece of furniture). As described above, data collected by the computing devices 602 and 604 may be utilized to detect such events, or in particular, an incident vector 612 caused by and/or indicative of the event.

Figure 8:
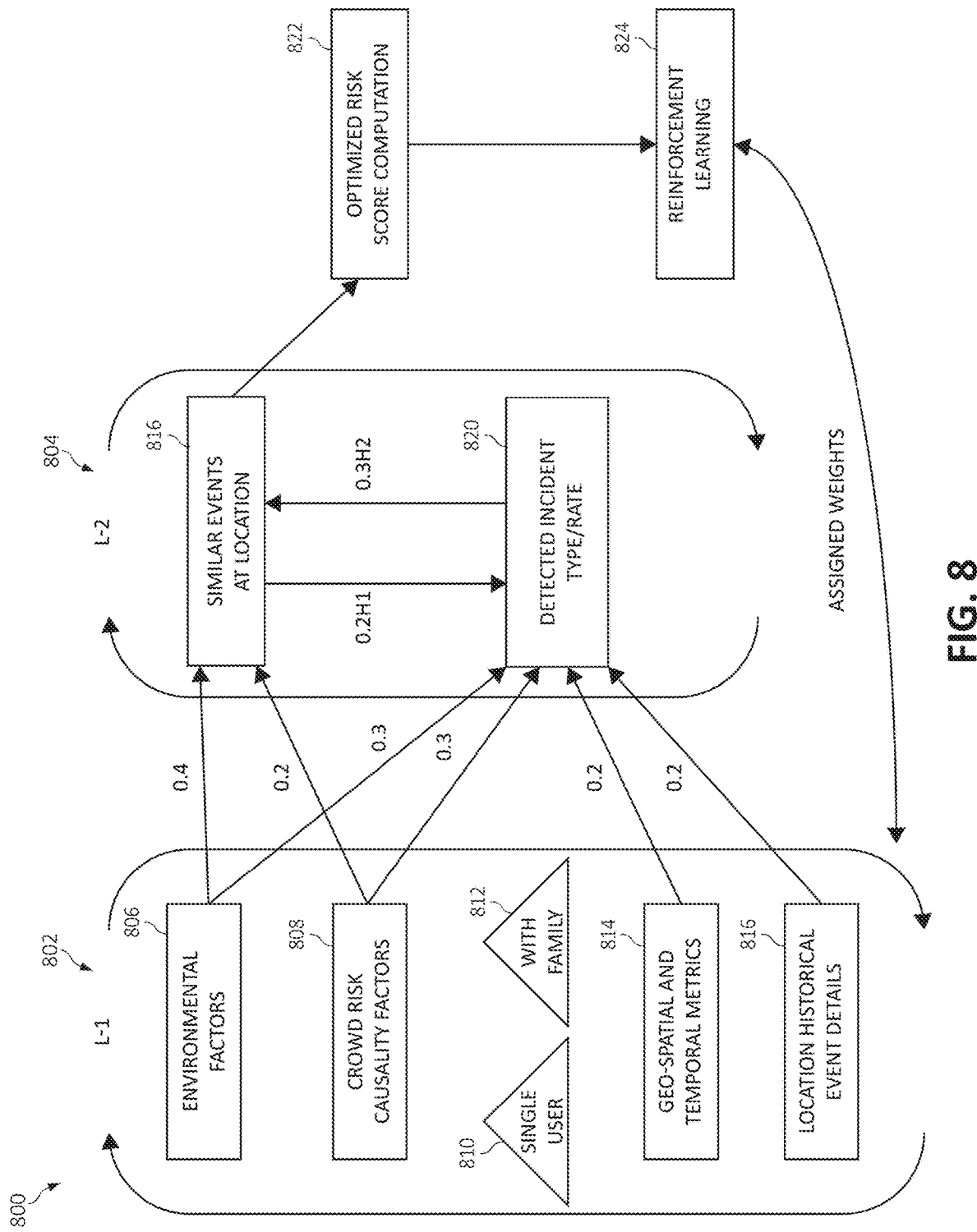
FIG. 8 is a diagram of a multi-level neural network classification model according to an embodiment of the present invention.

FIG. 8 illustrates a multi-level neural network classification model (or DLNN) 800 for risk factor evaluation or calculating hazard risk scores, according to some embodiments. The model 800 may be utilized to assess the risk of hazards (or hazardous incidents or events) for different users based on, for example, location characteristics, environmental factors (e.g., steps, stairs, floor, etc.), geo-spatial metrics, and fall type and/or abnormality rate. The model 800 may, for example, proactively obtain user feedback and social media information to make adjustments (e.g., to configurable weights, such as 0.4, 0.2h1, etc. as shown in FIG. 8) to improve the performance thereof over time.

The model includes a first layer (L-1) 802 and a second layer (L-2) 804. The first layer 802 includes (and/or utilizes) environmental factors 806, crowd risk causality factors 808 (including those of the individual user 810 and other users 812), geo-spatial and temporal metrics 814, and historical event (or incident) details at the location 816. The environmental factors 806 may refer to details about a particular location or venue (e.g., steps, objects, floor surface type, etc.), as described above. The crowd risk causality factors 808 may refer to any information or data associated with a particular user and/or other users (e.g., data related to gait, a profile of the users, social media activity, etc.). In some embodiments, the causality factors for the individual user 810 and those of the other users 812 are assigned equal weights. However, those weights, as with the other weights shown in FIG. 8, may be configurable. The geo-spatial and temporal metrics 814 may refer to the exact location (or other details) of the venue, the location of the user (e.g., within the venue), and the time at which the user is at the venue. The historical details 816 may refer to information related to incidents at the venue (e.g., as retrieved from newsfeeds, social media activity, etc.).

The second layer 804 includes (and/or utilizes) similar events at the location 818 and the type and/or rate of detected incidents 820, which may be at least in part based on the elements of the first layer 802 as shown in FIG. 8. An optimized risk score (or hazard risk score) 822 may be calculated as shown. Reinforcement learning 824 may be performed based on, for example, feedback provided by users and/or further monitoring of the users (e.g., monitoring for falls, other incidents, etc.), which may be used to adjust the configurable weights (and/or adjust other parameters) that may be used to tune the calculation of the hazard risk score and/or train the first layer 802.

Figure 9:
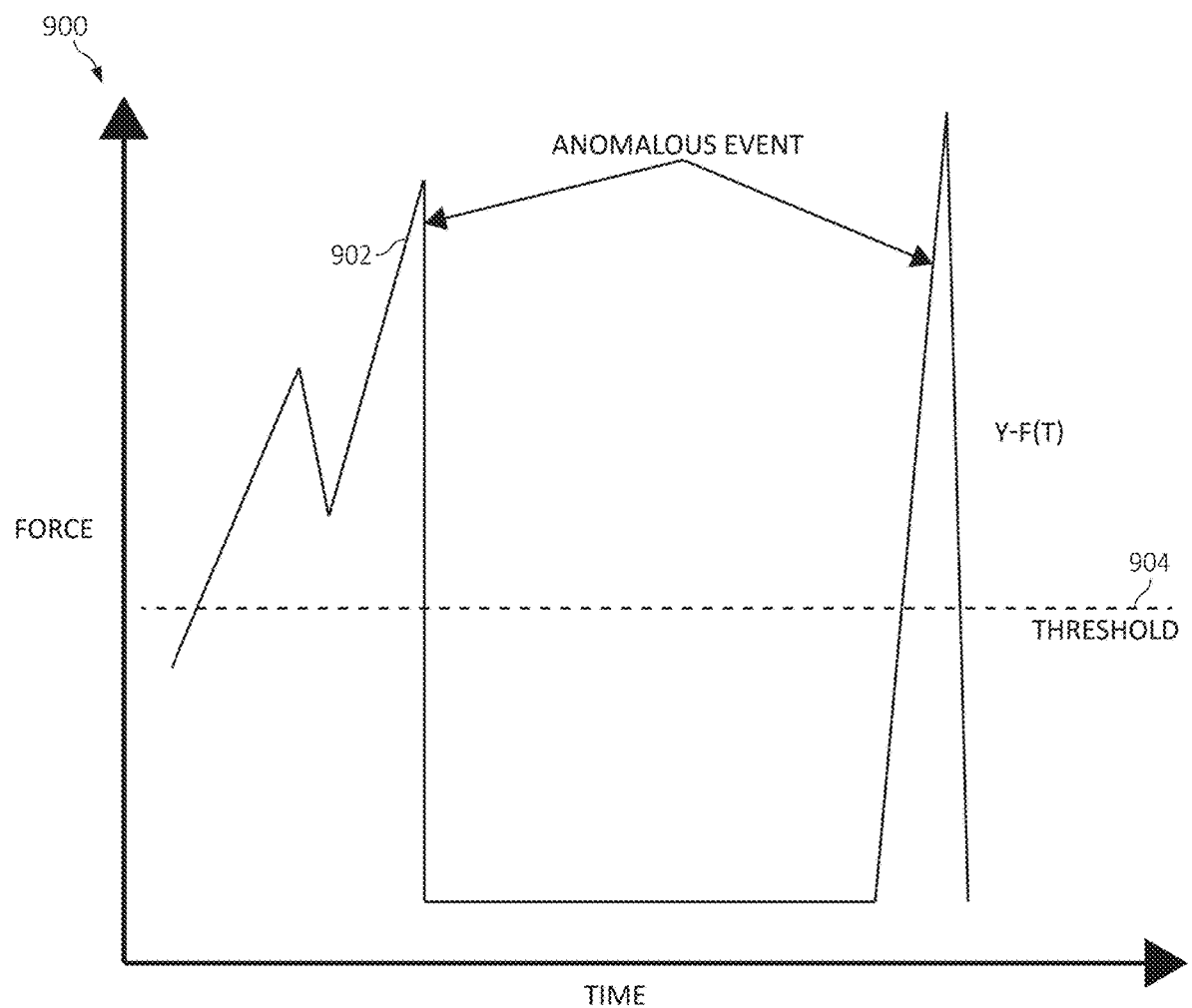
FIG. 9 is a graph depicting the detecting of an incident according to an embodiment of the present invention.

FIG. 9 is a graph illustrating the detecting of an incident (e.g., a fall, walking into an object, etc.) and/or determining the accumulated impact from one or more incidents, according to some embodiments. In particular, FIG. 9 shows a force (or the output classifier function) 902 as detected by, for example, one or more computing devices carried by a user over a period of time. In some embodiments, incidents, or anomalous events, falls, etc., are only detected if the force 902 exceeds a threshold (e.g., a configurable or selectable threshold) 904. The accumulated impact may be determined by taking the integral of the output classifier function (Y=f(t)), or at least the portions thereof that exceed the threshold 904. The output classifier function may act as, for example, a sudden step function or ramp function, or take sigmoid form.

Figure 10:
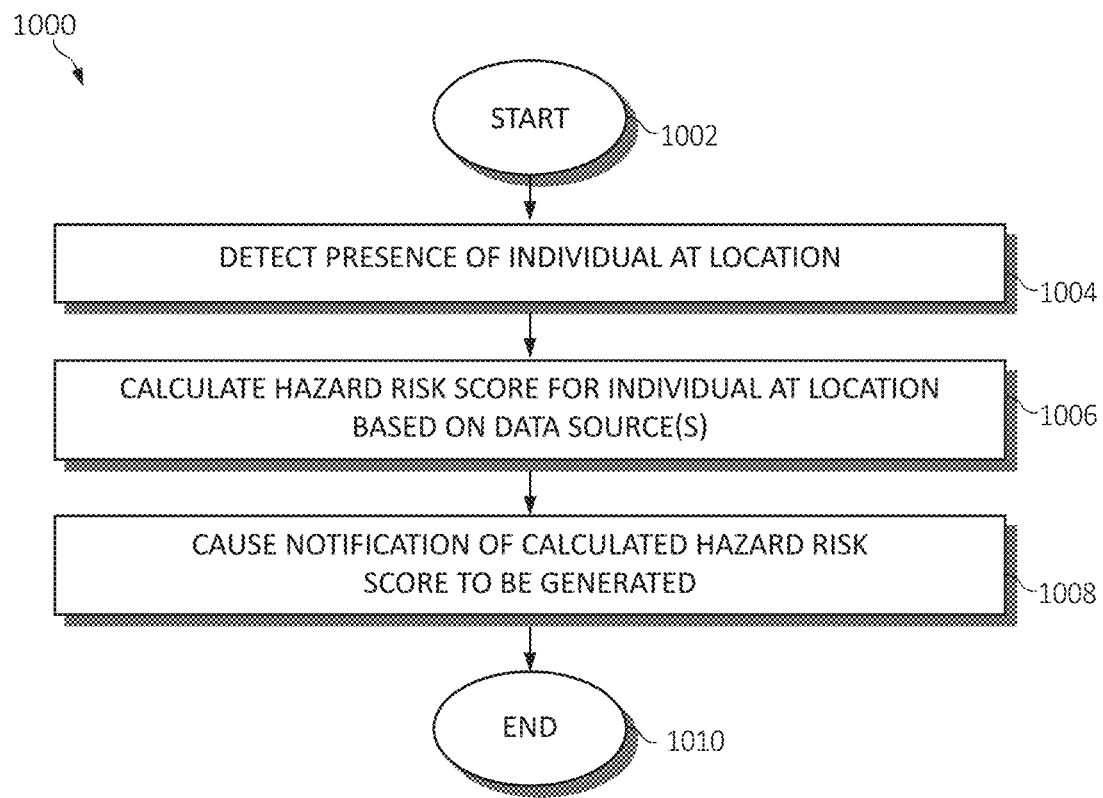
FIG. 10 is a flowchart diagram of an exemplary method for managing hazard risk according to an embodiment of the present invention.

Turning to FIG. 10, a flowchart diagram of an exemplary method 1000 for managing hazard risk, in accordance with various aspects of the present invention, is provided. Method 1000 begins (step 1002) with, for example, an individual (or user) registering with a system in which the computing devices of multiple users are utilized to collect data regarding incidents, such as falls, walking/running into objects, etc. at different locations.

A presence of an individual at a location is detected (step 1004). The presence of the individual at the location may be performed utilizing a computing device carried or worn by the individual (e.g., via GPS, wireless communications, cameras, etc.), such a mobile electronic device (e.g., a mobile phone, wearable device, etc.). The presence of the individual at the location may be performed in real-time (e.g., when the individual is at the location) or before the arrival of the individual at the location (e.g., as indicated by a schedule of the individual).

A hazard risk score (e.g., for the individual and/or the location) is calculated (or determined) based on at least one data source associated with at least one of the individual and the location (step 1006). The at least one data source may include data associated with the presence of other individuals at the location, an online data source associated with the location, data that is collected by a computing device (e.g., a mobile phone or wearable device) of the individual, and/or environmental factors associated with the location. The environmental factors may be associated with at least one of floor surface type at the location, steps at the location, and the presence of objects at the location. The calculating of the hazard risk score may be performed utilizing a cognitive analysis.

A notification of the calculated hazard risk score is caused to be generated (step 1008). For example, a notification may be caused to be provided to the individual and/or other individuals (e.g., a caretaker of the individual). In particular, an electronic communication, such as a text message, email, etc., may be sent to (and/or rendered by) the individual's computing device (e.g., a mobile phone or other suitable computing node) and/or that of other individuals, such as friends, family, doctors, etc. As another example, the calculated hazard risk score may be stored on a database (e.g., on the cloud) to be used later to calculate a hazard risk score for other individuals (or users).

Method 1000 ends (step 1010) with, for example, the appropriate action (if any) being performed by the individual or others. For example, if the individual receives a notification about a relatively high hazard risk score for a particular area of a venue near their current location, the individual may avoid that area and/or alert others of the possibility that he/she may experience difficulty in that area (e.g., so that assistance may be located/provided). The process may be repeated when the presence of the individual, or other individuals, at the location, or other locations, is detected. In some embodiments, the user(s) may provide feedback to the system (e.g., via any suitable computing node), which may be utilized by the system to improve performance over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing hazard risk comprising:
   detecting a presence of an individual at a location, the location comprising a certain geographical position;
   assigning a hazard risk score based on at least one data source associated with at least one of the individual and the location, wherein the hazard risk score is representative of a risk of injury to the individual at the location stemming from detected prior incidents at the location, and wherein detecting the prior incidents includes utilizing a deep learning neural network (DLNN) machine learning algorithm to analyze input features pertaining to geo-spatial conditions to perform object detection at the location from an incident vector matrix; and
   causing a notification of the assigned hazard risk score to be generated.

2. The method of claim 1, wherein the assigning of the hazard risk score is performed utilizing a cognitive analysis.

3. The method of claim 1, wherein the at least one data source includes data associated with the presence of other individuals at the location.

4. The method of claim 1, wherein the at least one data source includes data collected by a mobile electronic device associated with the individual.

5. The method of claim 1, wherein the at least one data source includes an online data source associated with the location.

6. The method of claim 1, wherein the at least one data source includes environmental factors associated with the location, wherein the environmental factors are associated with at least one of floor surface type at the location, steps at the location, and the presence of objects at the location.

7. The method of claim 1, wherein the causing of the notification of the calculated hazard risk score to be generated includes causing the notification to be rendered by a computing node associated with at least one of the individual and a caretaker of the individual.

8. A system for managing hazard risk comprising:
   at least one memory; and
   at least one processor executing instructions stored in the at least one memory; wherein the at least one processor, when executing the instructions:
      detects a presence of an individual at a location, the location comprising a certain geographical position;
      assigns a hazard risk score based on at least one data source associated with at least one of the individual and the location, wherein the hazard risk score is representative of a risk of injury to the individual at the location stemming from detected prior incidents at the location, and wherein detecting the prior incidents includes utilizing a deep learning neural network (DLNN) machine learning algorithm to analyze input features pertaining to geo-spatial conditions to perform object detection at the location from an incident vector matrix; and
      causes a notification of the assigned hazard risk score to be generated.

9. The system of claim 8, wherein the assigning of the hazard risk score is performed utilizing a cognitive analysis.

10. The system of claim 8, wherein the at least one data source includes data associated with the presence of other individuals at the location.

11. The system of claim 8, wherein the at least one data source includes data collected by a mobile electronic device associated with the individual.

12. The system of claim 8, wherein the at least one data source includes an online data source associated with the location.

13. The system of claim 8, wherein the at least one data source includes environmental factors associated with the location, wherein the environmental factors are associated with at least one of floor surface type at the location, steps at the location, and the presence of objects at the location.

14. The system of claim 8, wherein the causing of the notification of the calculated hazard risk score to be generated includes causing the notification to be rendered by a computing node associated with at least one of the individual and a caretaker of the individual.

15. A computer program product for managing hazard risk by one or more processors, the computer program product comprising a non-transitory computer-readable storage medium having computer-readable program code portions stored therein, the computer-readable program code portions comprising:
   an executable portion that detects a presence of an individual at a location, the location comprising a certain geographical position;
   an executable portion that assigns a hazard risk score based on at least one data source associated with at least one of the individual and the location, wherein the hazard risk score is representative of a risk of injury to the individual at the location stemming from detected prior incidents at the location, and wherein detecting the prior incidents includes utilizing a deep learning neural network (DLNN) machine learning algorithm to analyze input features pertaining to geo-spatial conditions to perform object detection at the location from an incident vector matrix; and an executable portion that causes a notification of the assigned hazard risk score to be generated.

16. The computer program product of claim 15, wherein the assigning of the hazard risk score is performed utilizing a cognitive analysis.

17. The computer program product of claim 15, wherein the at least one data source includes data associated with the presence of other individuals at the location.

18. The computer program product of claim 15, wherein the at least one data source includes data collected by a mobile electronic device associated with the individual.

19. The computer program product of claim 15, wherein the at least one data source includes an online data source associated with the location.

20. The computer program product of claim 15, wherein the at least one data source includes environmental factors associated with the location, wherein the environmental factors are associated with at least one of floor surface type at the location, steps at the location, and the presence of objects at the location.

21. The computer program product of claim 15, wherein the causing of the notification of the calculated hazard risk score to be generated includes causing the notification to be rendered by a computing node associated with at least one of the individual and a caretaker of the individual.

* * * * *